United States Patent [19]

Sahashi et al.

[11] Patent Number: 4,849,017

[45] Date of Patent: Jul. 18, 1989

[54] MAGNETIC REFRIGERANT FOR MAGNETIC REFRIGERATION

[75] Inventors: Masashi Sahashi; Koichiro Inomata, both of Yokohama, Japan

[73] Assignee: Kabushiki Kaisha Toshiba, Kawasaki, Japan

[21] Appl. No.: 824,219

[22] Filed: Jan. 30, 1986

[30] Foreign Application Priority Data

Feb. 6, 1985 [JP] Japan .................. 60-20030
Feb. 6, 1985 [JP] Japan .................. 60-20029
Oct. 2, 1985 [JP] Japan .................. 60-217970

[51] Int. Cl.$^4$ ............................. C22B 00/00
[52] U.S. Cl. ............................. 75/245; 148/301; 148/400; 420/416
[58] Field of Search .............. 420/416; 148/301, 400; 75/245

[56] References Cited

U.S. PATENT DOCUMENTS

| | | | |
|---|---|---|---|
| 3,447,912 | 6/1969 | Ortner et al. | 420/416 |
| 3,560,200 | 2/1971 | Nesbitt et al. | 420/416 |
| 4,003,767 | 1/1977 | Bachmann et al. | 420/416 |
| 4,378,258 | 3/1983 | Clark et al. | 148/100 |

FOREIGN PATENT DOCUMENTS

| | | |
|---|---|---|
| 2562082 | 10/1985 | France. |
| 52-48098 | 4/1977 | Japan .................. 420/416 |
| 53-14611 | 2/1978 | Japan .................. 420/416 |
| 53-72724 | 6/1978 | Japan .................. 420/416 |
| 53-43373 | 11/1978 | Japan .................. 420/416 |
| 60-155636 | 8/1985 | Japan .................. 420/416 |
| 497116 | 7/1976 | U.S.S.R. .................. 420/416 |

OTHER PUBLICATIONS

T. Hashimoto et al., "The Magnetic Refrigeration Characteristics of Several Magnetic Refrigerants Below 20K: I Magnetcaloric Effect" proceedings of ICEC, vol. 9, May, 1982, pp. 26–29.

C. B. Zimm et al., "Low Hysteresis Materials for Magnetic Refrigeration: $Gd_{1-x}ER_xAl_2a$)", Journal of Applied Physics, vol. 55, No. 6, Mar. 15, 1984, pp. 2509–2510.

F. Pourarian, "Exchange-Striction of Rare Earth-$Al_2$ Laves Phase Compounds", J. Phys. Chem Solids, vol. 41, No. 2, 1980, pp. 123–127.

*Primary Examiner*—John P. Sheehan
*Attorney, Agent, or Firm*—Foley & Lardner Schwartz, Jeffery, Schwaab, Mack, Blumenthal & Evans

[57] ABSTRACT

A magnetic refrigerant for magnetic refrigeration which comprises a sintered body containing at least one of rare earth elements selected from the group consisting of lanthanum, cerium, praseodymium, neodymium, promethium, samarium, europium, gadolinium, terbium, dysprosium, holmium, erbium, thulium, ytterbium and yttrium and a balance consisting essentially of at least one of aluminum, nickel and cobalt.

This invention provides sintered magnetic bodies which are suited for use as magnetic refrigerants, and also provides significant contribution to the performance improvement of magnetic refrigerators and to the materialization of regenerator-type magnetic refrigerants.

14 Claims, No Drawings

MAGNETIC REFRIGERANT FOR MAGNETIC REFRIGERATION

BACKGROUND OF THE INVENTION

This invention relates to magnetic refrigerants which can effect cooling owing to their magneto-caloric effects. They are useful for magnetic refrigeration.

Reflecting significant developments in the superconductivity technology in recent years, the use of superconductivity is now being contemplated in a wide variety of fields such as industrial electronics, information industry and medical equipment. In order to make use of superconductive techniques, it is indispensable to develop refrigerators which may be used to produce superlow temperature environments. The gas refrigeration method has been well known. However, this method has extremely low efficiency and requires large apparatus for its practice. As a new refrigeration method which may replace the conventional gas refrigeration method, intensive researches are now under way with respect to the magnetic refrigeration method making use of the magneto-caloric effects of magnetic materials ("Proceedings of ICEC", 9, 26–29, May, 1982) "Advances in cryogenic Engineering", 29, 581–587, 1984), the contents of which are hereby incorporated by reference. Describing in short, the magnetic refrigeration method makes use of the endothermic-exothermic reaction which takes place owing to a change in entropy between an aligned spin state of a magnetic material upon application of a magnetic field to the magnetic material and a random spin state of the magnetic material upon removal of the magnetic field. This magnetic material is called a magnetic refrigerant". The magnetic refrigeration method has such inherent merits that it permits the use of smaller apparatus and brings about higher efficiency. It is thus believed to be a promising refrigeration method. The efficiency of magnetic refrigeration varies considerably from one magnetic refrigerant to another. Hence, each magnetic refrigerant is required to have large entropy and good thermal conductivity.

Researches have been made on various magnetic refrigerants. As exemplary magnetic refrigerants for target refrigeration temperature range of 20° K. or lower, may be mentioned single crystals of garnet-type oxides which contain one or more rare earth elements, typified by $Gd_3Ga_5O_{12}$(GGG) and $Dy_3Al_5O_{12}$ (DAG) ("Proceedings of ICEC", 30–33, May 1982; etc.). Illustrative of those intended for the temperature range of 77° K. to 15° K. include Laves-type $RAl_2$ intermetallic compounds in which R stands for a rare earth metal ("Abstracts of Lectures of November, 1984", The Society of Cryogenic Engineering).

These magnetic refrigerants are required to develop large entropy changes ($\Delta S$) in their respective refrigeration temperature ranges. Taking a magnetic refrigerant for the wide temperature range of from 77° K. (the temperature of liquid nitrogen) to 15° K. by way of example, the magnetic refrigerant is required to show a large entropy change in the wide temperature range while having the same crystalline structure there. In order to develop such a large entropy change, it is necessary for the magnetic refrigerant to have magnetic transition temperatures which vary successively from one to another.

In intermetallic compounds of rare earth metals which have the same crystalline structure, the magnetic transition temperature which vary successively from one to another is readily obtained by substitution of the rare earth elements and thus a large entropy changes in the vicinity of magnetic transition temperature can be obtained in a wide range of temperature (for example from 77° K. to 15° K.)

As such magnetic materials, the above-described Laves-type $RAl_2$ intermetallic compounds may be mentioned.

When the practical utility of a magnetic refrigerant is taken into consideration, the magnetic refrigerant is required to have high degrees of freedom and accuracy in machinability in addition to the above-mentioned characteristics. It will obviously be very effective if a sintered body satisfying all the above characteristics is obtained.

The above-mentioned Laves-type $RAl_2$ intermetallic compounds are expected to have poor sinterability because the melting points of $RAl_2$ are all high, i.e., above 1500° C., although no report has been published as to the sintering of the Laves-type $RAl_2$ intermetallic compounds. In view of the need for their sintering at high temperatures above 1500 ° C., they are accompanied by an economical drawback. They involve another economical drawback due to inclusion of the component R in large amounts. The high R contents lead to another problem, namely, low thermal conductivity. As a matter of fact, no effective sintered magnetic body has yet been obtained as a magnetic refrigerant suitable for use in magnetic refrigeration.

In magnetic refrigeration for the temperature range of 77° K. to 15° K. or so, it is desirable to employ a regenerater-type cycle such as the Ericsson cycle because the lattice entropy serves as a dominant contributor. In such a regenerater-type refrigerator, it is indispensable to maintain a high degree of thermal conduction between its magnetic refrigerant and refrigerant material. This thermal conduction gives substantial influenece to the cooling efficiency. Here, it should be noted that solid refrigerant materials such as lead are only available for superlow temperatures below 77° K. It is thus necessary to establish solid-to-solid contact between the magnetic refrigerant and its associated refrigerant material or to form a narrow gap such as He gas film between the refrigerant and refrigerant material and to effect their heat exchange through the narrow gap. Whichever method is used, high-accuracy machining such as mirror finishing and machining of complex configurations is required for both magnetic refrigerant and refrigerant materials ("Abstracts of Lectures of November, 1984", The society of Cryogenic Engineering). For such regenerater-type refrigerators, there has been a special demand for the development of magnetic refrigerants having good machinability.

SUMMARY OF THE INVENTION

With the foregoing in view, the present invention has as its object the provision of a magnetic refrigerant capable of producing a large entropy change and having high thermal conductivity and excellent machinability.

With a view toward using a sintered magnetic body of good machinability as a magnetic refrigerant, the present inventors have proceeded with a research on the sinterability of $RM_2$ in which R means at least one of rare earth elements ranging from La to Yb in the periodic table and Y (namely, lanthanum (La), cerium (Ce), praseodymium (Pr), neodymium (Nd), promethium (Pm), samarium (Sm), europium (Eu), gadolinium (Ga), terbium (Tb), dysprosium (Dy), holmium (Ho), erbium (Er), thulium (Tm), ytterbium (Yb) and yttrium (Y)) and M denotes at least one of aluminum (Al), nickel (Ni) and cobalt (Co). As a result, it has been found that compounds of $RM_2$ in each of which the molar ratio of R to M is 1:2 do not provide good sintered bodies; but, when M is Al, good sintered bodies are obtained by the use of Al in proportions greater than its stoichimetric proportions, namely, from $RAl_{2+x}$ ($x>0$); and when M is either Ni or Co, good sintered bodies are obtained by the use of R in proportions greater than its stoichiometric proportions, namely, by $R_{1+x}Ni_2$ or $R_{1+x}Co_2$ ($x>0$). It has also found that the thus-obtained sintered bodies are good in both thermomagnetic characteristics and thermal conductivity. The above findings have led to the completion of this invention.

In one aspect of this invention, there is thus provided a magnetic refrigerant for magnetic refrigeration, comprising a sintered body which contains at least one of rare earth elements selected from the group consisting of La, Ce, Pr, Ne, Pm, Sm, Eu, Gd, Tb, Dy, Ho, Er, Tm, Yb and Y and a balance consisting essentially of at least one of Al, Ni and Co.

The above-described sintered body has a bulk density as high as 80% and develops a large magnetic entropy change in the vicinity of a magnetic transition point (Curie temperature) in the range of 77° K. to 15° K.

DESCRIPTION OF THE PREFERRED EMBODIMENTS

Description will first of all be made on magnetic refrigerants in each of which the balance, namely, M is aluminum.

Pertaining to the content of at least one of the rare elements ranging from La to Yb in the periodic table and Y, its contents less than 70% by weight result in smaller magneto-caloric effects, i.e., smaller magnetic entropy changes whereas its contents exceeding 75% by weight lead to significant reduction of sinterability and thermal conductivity characteristics. Its preferred content may thus range from 70 to 75% by weight. Of the above rare earth elements, each of the heavy rare earth elements ranging from Gd to Yb into the periodic table has a greater magnetic moment per its ion. They can thus improve the magneto-caloric effects, whereby they are effective to improve the efficiency of magnetic refrigeration. It is thus preferred to contain such a heavy rare earth element in an amount of 50% by weight or more. By the way, the density of each sintered body varies depending on its sintering conditions and the like and gives substantial influence to its thermal conductivity characteristics. As far as magnetic refrigerants for magnetic refrigeration are concerned, their densities may preferably be 5 g/cm$^3$ or more. If the density is too small, the thermal conductivity characteristics will be lowered considerably.

Next description will be made on magnetic refrigerants in each of which the balance, namely, M is nickel.

Pertaining to the content of at least one of the rare elements ranging from La to Yb in the periodic table and Y, its contents exceeding 65% by weight result in smaller magneto-caloric effects, i.e., smaller magnetic entropy changes whereas its contents less than 55% by weight lead to significant reduction of sinterability and thermal conductivity characteristics. Its preferred content may thus range from 55 to 65% by weight. Of the above rare earth elements, each of the heavy rare earth elements ranging from Gd to Yb may preferably be contained in an amount of 35% by weight or more for the same reasons as mentioned above in connection with aluminum as M. By the way, the density may preferably be 8 g/cm$^3$ or more for the same reasons as mentioned above in connection with aluminum as M. If the density is too small, the thermal conductivity characteristics will be lowered considerably.

Where the balance, namely, M is cobalt, the following conditions are preferred.

Pertaining to the content of at least one of the rare elements ranging from La to Yb in the periodic table and Y, its contents exceeding 65% by weight result in smaller magneto-caloric effects, i.e., smaller magnetic entropy changes whereas its contents less than 55% by weight lead to significant reduction of sinterability and thermal conductivity characteristics. Furthermore, the efficiency of magnetic refrigeration is lowered due to inclusion of $RCo_3$ having a high magnetic transition temperature. Its preferred content may thus range from 55 to 65% by weight. Among the rare earth elements, each of the heavy rare earth elements may preferably be contained in an amount of 35% by weight or more for the same reasons as mentioned above. In addition, the density of the sintered body may desirably be 7 g/cm$^3$ or more for the same reasons as mentioned above. If the density is too small, the thermal conductivity characteristics will be lowered considerably.

Such a magnetic refrigerant may be prepared in the following manner.

First of all, an R-M alloy having a desired composition is prepared in an arc-melting furnace or the like. The alloy is then ground to obtain fine particles of the R-M alloy. The particle sizes of these fine particles affect the density of the resulting sintered body. The range of from 1 $\mu$m to 10 $\mu$m is preferred. If the particle sizes are more than 10 um, the density will be lowered. On the other hand, particle sizes less than 1 $\mu$m will result in easier oxidation and hence reduced magneto-caloric effects and also in a lowered density.

The above fine particles of the R-M alloy are then press-formed into a desired shape, followed by its sintering. The sintering is carried out in a non-oxidizing atmosphere such as an inert gas, for example, argon gas.

Sintering temperature may be mentioned as one of principal factors which govern the density of the resulting sintered body. Where M is Al, 900° to 1,200° C. is preferred. The sintering temperatures less than 900° C. will fail to achieve high densities. However, at sintering temperatures in excess of 1200° C., difficulties will be encountered in obtaining good sintered bodies because of oxidation, evaporation and the like. The present inventors have found that a dense sintered body having a bulk density greater than 80%, a density of 5 g/cm$^3$ or more and a maximum bulk density in excess of 98% can be obtained by using a solid-liquid phase reaction curve present around 1,000° C. between $RAl_2$ and $RAl_3$ on its phase diagram; the sintered body exhibits good thermomagnetic characteristics and thermal conductivity without being affected by $RAl_3$ which is an antiferromagnet; and the characteristics of the sintered body are similar to those of a Laves-type $RAl_2$ intermetallic compound as a flux.

When M is Ni, the sintering temperature may preferably be 850° to 1,150° C. The sintering temperatures less than 850° C. will be unable to achieve high densities, whereas the temperatures in excess of 1,150° C. will be difficult to obtain good sintered bodies due to oxidation, evaporation and the like. The present inventors have found that a dense sintered body having a bulk density greater than 80%, a density of 8 g/cm³ or more and a maximum bulk density in excess of 99% can be obtained by using a solid-liquid phase reaction curve present around 950° C. between RNi and RNi₂ on its phase diagram; the sintered body exhibits good thermomagnetic characteristics and thermal conductivity without being affected by the magnetic influence of RNi; and the characteristics of the sintered body are similar to those of a Laves-type RNi₂ intermetallic compound as a flux.

When M is Co, the sintering temperature may preferably be 500° to 1,100° C. The sintering temperatures less than 500° C. will be unable to achieve high densities, whereas the temperatures in excess of 1,000° C. will be difficult to obtain good sintered bodies due to oxidation, evaporation and the like. The present inventors have found that a dense sintered body having a bulk density greater than 80%, a density of 7 g/cm³ or more and maximum bulk density in excess of 99% can be obtained by using a solidliquid phase reaction curve present around 600° to 1,000° C. between R₉Co₄-RCo₂ (R: Y, La to Er) and R₄Co₃-RCo₂ (R: Gd to Yb) on its phase diagram; the sintered body exhibits good thermomagnetic characteristics and thermal conductivity without being affected by the magnetic influence of R₉Co₄ or R₄Co₃; and the characteristics of the sintered are similar to those of a Laves-type RCo₂ intermetallic compound as a flux.

Incidentally, this invention may be practiced by using Al, Ni and/or Co raw materials of industrial grades which are generally employed in the industry. Impurities such as Ca, Cu, Si, Fe, Mn, Mg, Zn, Ti, C, N and 0 may also be contained in such trace amounts that they are usually contained. Other impurities may also be contained to such extents that they do not adversely affect the effects of this invention.

Of these impurities, the elements such as Ca, Mg, Si, Ti and C having strong deoxidizability are effective for this invention.

In order to improve the thermal conductivity characteristics, the sintered body may be subjected to a heat treatment so as to effect micro structure control subsequent to its sintering. The temperature of the heat treatment may preferably be below the sintering temperature when M is Al, 700° to 900° C. or so when M means Ni and 500° to 800° C. or so when M stands for Co. Grain growth and the like may be considered as possible causes for such improved thermal conductivity characteristics.

Description has been made above supposing that M is substantially Al, Ni or Co. Needless to say, sintered bodies each of which makes use of M consisting essentially of a combination of two or more of Al, Ni and Co can of course achieve the above-described object of this invention.

As has been described above, this invention can provide a magnetic refrigerant which has excellent thermomagnetic characteristics and thermal conductivity and sufficient machinability and is thus suited for magnetic refrigeration.

The magnetic refrigerant of this invention has a high degree of machining freedom and permits complex and high-accuracy machining. When it is employed as a magnetic refrigerant for magnetic refrigeration at the temperature of liquid nitrogen or less where the contribution of lattice entropy is great and the use of regenerater-type cooling method is necessary, such as the Ericsson cycle, the magnetic refrigerant of this invention achieves good thermal conduction. It is thus particularly effective for such applications.

EXAMPLES 1 TO 30 AND COMPARATIVE EXAMPLES 1 TO 7

This invention will hereinafter be described by the following Examples.

An alloy of a rare earth element and at least one of aluminum, nickel and cobalt, which alloy had a prescribed composition, was prepared in an arc-melting furnace. After grinding the alloy into fine powder having a particle size of about 3 μm or so in a ball mill, the resultant fine powder was press-formed to obtain a green compact. This green compact was sintered in an atmosphere of Ar gas.

With respect to the thus-obtained sintered body, its density, effective Bohr magneton number determined by the measurement of its paramagnetic susceptibility, Curie point and thermal conductivity (at the Curie point) were measured. Measurement data are given in Tables 1 to 4, together with the compositions of their corresponding alloys and the sintering conditions.

TABLE 1

| | Composition (% by weight) | | | | | | | Sintering conditions (°C. × Hr) | Density (g/cm³) | Effective Bohr magneton number ($\mu_B$) | Curie point (°K.) | Thermal conductivity (mw/cm · °K.) |
|---|---|---|---|---|---|---|---|---|---|---|---|---|
| | Dy | Er | Ho | Gd | Tb | Pr | Al | | | | | |
| Example | | | | | | | | | | | | |
| 1 | 72.4 | — | — | — | — | — | Balance | 1100 × 2 | 5.72 | 11.20 | 49.7 | 120 |
| 2 | 74.5 | — | — | — | — | — | Balance | 1100 × 2 | 5.68 | 10.93 | 55.3 | 150 |
| 3 | — | 55.2 | — | 18.3 | — | — | Balance | 1080 × 2 | 5.65 | 10.03 | 82.9 | 200 |
| 4 | — | 35.2 | 37.9 | — | — | — | Balance | 1085 × 2 | 5.71 | 10.78 | 24.3 | 105 |
| 5 | 69.8 | — | — | 3.7 | — | — | Balance | 1100 × 2 | 5.75 | 10.80 | 62.5 | 140 |
| 6 | 58.2 | — | — | — | 15.2 | — | Balance | 1105 × 2 | 5.78 | 11.32 | 63.2 | 170 |
| 7 | — | — | — | 35.7 | — | 34.8 | Balance | 1050 × 2 | 5.63 | 6.35 | 42.6 | 500 |
| 8 | — | — | — | 9.7 | — | 63.5 | Balance | 1050 × 2 | 5.65 | 3.24 | 51.2 | 540 |
| Comp. Example | | | | | | | | | | | | |
| 1 | 77.2 | — | — | — | — | — | Balance | 1100 × 2 | 4.20 | 11.09 | 52.8 | 25 |
| 2 | — | 32.5 | — | 45.8 | — | — | Balance | 1080 × 2 | 3.90 | 9.78 | 132.0 | 14 |
| 3 | 27.2 | — | 21.9 | — | — | — | Balance | 1050 × 2 | 5.12 | 11.02 | — (Non Ferro) | 100 |

TABLE 2

| | Composition (% by weight) | | | | | | | Sintering conditions (°C. × Hr) | Density (g/cm³) | Effective Bohr magneton number ($\mu_B$) | Curie point (°K.) | Thermal conductivity (mw/cm · °K.) |
|---|---|---|---|---|---|---|---|---|---|---|---|---|
| | Dy | Er | Ho | Gd | Tb | Pr | Ni | | | | | |
| Example | | | | | | | | | | | | |
| 9 | 59.0 | — | — | — | — | — | Balance | 995 × 1.5 | 9.85 | 10.98 | 29.5 | 300 |
| 10 | 61.5 | — | — | — | — | — | Balance | 995 × 1.5 | 9.92 | 11.20 | 30.2 | 350 |
| 11 | — | — | — | 60.2 | — | — | Balance | 1020 × 1.5 | 9.76 | 9.47 | 21.5 | 270 |
| 12 | — | 9.1 | — | 50.9 | — | — | Balance | 980 × 1.5 | 9.89 | 8.43 | 80.4 | 540 |
| 13 | 55.2 | — | — | 4.3 | — | — | Balance | 980 × 1.5 | 9.93 | 9.23 | 72.9 | 480 |
| 14 | 42.3 | — | — | — | 18.7 | — | Balance | 1000 × 1.5 | 9.78 | 10.85 | 38.2 | 372 |
| 15 | — | — | — | 26.8 | — | 30.2 | Balance | 875 × 1.5 | 9.91 | 6.02 | 42.7 | 700 |
| 16 | — | — | — | 22.8 | — | 35.2 | Balance | 975 × 1.5 | 9.87 | 4.72 | 27.8 | 350 |
| Comp. Example | | | | | | | | | | | | |
| 4 | 53.0 | — | — | — | — | — | Balance | 995 × 1.5 | 6.95 | 10.82 | 28.2 | 25 |
| 5 | — | 26.2 | 27.1 | — | — | — | Balance | 980 × 1.5 | 5.79 | 10.76 | 20.8 | 17 |

TABLE 3

| | Composition (% by weight) | | | | | | | Sintering conditions (°K. × Hr) | Density (g/cm³) | Effective Bohr magneton number ($\mu_B$) | Curie point (°K.) | Thermal conductivity (mw/cm · °K.) |
|---|---|---|---|---|---|---|---|---|---|---|---|---|
| | Dy | Er | Ho | Tm | Pr | Co | | | | | | |
| Example | | | | | | | | | | | | |
| 17 | 61.2 | — | — | — | — | Balance | | 920 × 1.5 | 9.60 | 11.03 | 132 | 292 |
| 18 | 62.4 | — | — | — | — | Balance | | 920 × 1.5 | 9.73 | 11.25 | 127 | 360 |
| 19 | — | — | 61.9 | — | — | Balance | | 950 × 1.5 | 9.56 | 9.56 | 78 | 280 |
| 20 | — | 10.4 | 50.0 | — | — | Balance | | 900 × 1.5 | 9.70 | 8.67 | 65 | 600 |
| 21 | 56.0 | 3.5 | — | — | — | Balance | | 900 × 1.5 | 9.73 | 9.57 | 67 | 520 |
| 22 | 41.9 | — | — | 19.0 | — | Balance | | 890 × 1.5 | 9.58 | 10.95 | 32 | 335 |
| 23 | — | — | — | 25.9 | 31.5 | Balance | | 620 × 1.5 | 9.71 | 6.12 | 62 | 609 |
| 24 | — | — | — | 23.0 | 35.2 | Balance | | 610 × 1.5 | 9.67 | 5.20 | 61 | 327 |
| Comp. Example | | | | | | | | | | | | |
| 6 | 50.2 | — | — | — | — | Balance | | 1000 × 1.5 | 6.25 | 10.95 | 130 | 15 |
| 7 | — | 28.3 | 20.4 | — | — | Balance | | 1000 × 1.5 | 5.65 | 11.02 | 48 | 12 |

TABLE 4

| | Composition (% by weight) | | | | | | | | Sintering conditions (°C. × Hr) | Density (g/cm³) | Effective Bohr magneton number ($\mu_B$) | Curie point (°K.) | Thermal conductivity (mv/cm · °K.) |
|---|---|---|---|---|---|---|---|---|---|---|---|---|---|
| | Dy | Er | Ho | Pr | Nd | Al | Ni | Co | | | | | |
| Example | | | | | | | | | | | | | |
| 25 | — | — | — | 35.4 | 25.3 | 4.9 | Bal | — | 900 × 1.5 | 8.52 | 3.42 | 8 | 310 |
| 26 | — | — | — | 33.2 | 23.9 | — | Bal | — | 950 × 1.5 | 9.93 | 3.65 | 10 | 320 |
| 27 | 62.5 | — | — | — | — | 3.5 | Bal | — | 950 × 1.5 | 8.75 | 10.92 | 42 | 280 |
| 28 | — | 9.1 | 51.5 | — | — | — | 19.6 | Bal | 930 × 1.5 | 9.95 | 9.75 | 45 | 320 |
| 29 | — | 35.4 | 37.2 | — | — | 24 | 1.9 | Bal | 1050 × 1.5 | 7.20 | 9.54 | 32 | 300 |
| 30 | — | 10.3 | 49.8 | — | — | 2.8 | — | Bal | 950 × 1.5 | 8.90 | 9.20 | 45 | 400 |

Bal: Balance

Examples 1 to 30 relate to this invention. It is understood that the effective Bohr magneton number and thermal conductivity are both excellent in each of Examples 1 to 30. In each of Examples 1 to 6, heavy rare earth elements are contained in a total amount of 50% by weight or more. As will be readily envisaged from a comparison with Examples 7 and 8, the magnetic refrigerants of Examples 1 to 6 have greater effective Bohr magneton numbers and superior thermomagnetic effects.

Examples 9 to 14 and 17 to 22 relate to magnetic refrigerants each of which contains heavy rare earth elements in amount of 35% by weight or more. As will be readily envisaged from a comparison with Examples 15 and 23, the magnetic refrigerants of Examples 9 to 14 and 17 to 22 have greater effective Bohr magnetron numbers and superior thermomagnetic effects.

Examples 25 and 26 relate to magnetic regrigerants each of which contains only light rare earth elements as the rare earth metal. While, Examples 25 and 27 to 30 relates to magnetic refrigerants each of which contains two or more of Al, Ni and Co as the balance.

On the other hand, Comparative Examples 1 and 2 are directed to magnetic refrigerants in which rare earth elements are contained in excessively large amounts, while Comparative Examples 4, 5, 6 and 7 are concerned with magnetic refrigerants in which rare earth elements are contained too little on the contrary. It is understood that all the resultant magnetic refrigerants had smaller densities and inferior sinterability in Comparative Examples 1, 2, 4, 5, 6 and 7. Therefore, they are very inferior in thermal conductivity. This means that conduction of heat cannot be effectively performed. It is hence difficult to use them as magnetic refrigerants.

Furthermore, the magnetic refrigerant of Example 1 was subjected to a heat treatment at 900° C. for 140 hours. It was confirmed that its thermal conductivity was improved to 300 mw/cm.°K. The same tendency was also observed on the magnetic refrigerants of Examples 2 to 8.

Besides, the magnetic refrigerant of Example 9 was subjected to a heat treatment at 900° C. for 150 hours. As a result, it was confirmed that its thermal conductivity was improved to 500 mw/cm.°K. The same tendency was also observed on the magnetic refrigerants of Examples 10 to 16.

In addition, the magnetic refrigerant of Example 17 was subjected to a heat treatment at 700° C. for 150 hours. As a result, it was confirmed that its thermal conductivity was improved to 650 mw/cm.°K. The same tendency was also observed on the magnetic refrigerant of Examples 18 to 24.

As has been described above, this invention can provide sintered magnetic bodies which are suited for use as magnetic refrigerants. Hence, this invention provides significant contribution to the performance improvement of magnetic refrigerators and to the materialization of regenerator-type magnetic refrigerants.

We claim:

1. A magnetic refrigerant for magnetic refrigeration which comprises a sintered body consisting essentially of at least one rare earth element selected from the group consisting of lanthanum, cerium, praseodymium, neodymium, promethium, samarium, europium, gadolinium, terbium, dysprosium, holmium, erbium, thulium, ytterbium and yttrium and a balance consisting essentially of aluminum, wherein the content of said rare earth element is from 70 to 75% by weight.

2. The magnetic refrigerant according to claim 1, wherein said sintered body comprises (a) at least about 50% by weight and not more than about 75% by weight of at least one heavy rare earth elements selected from the group consisting of gadolinium, terbium, dysprosium, holmium, erbium, thulium and ytterbium and (b) up to about 25% by weight of at least one rare earth element from the group consisting of lanthanum, cerium, praseodymium, neodymium, promethium, samarium, europium, and yttrium.

3. The magnetic refrigerant according to claim 1, wherein said sintered body has a density of 5 g/cm$^3$ or more.

4. The magnetic refrigerant according to claim 1, wherein the balance further contains at least one of nickel and cobalt.

5. A magnetic refrigerant for magnetic refrigeration which comprises a sintered body consisting essentially of at least one rare earth element selected from the group consisting of lanthanum, cerium, praseodymium, neodymium, promethium, samarium, europium, gadolinium, terbium, dysprosium, holmium, erbium, thulium, ytterbium and yttrium and a balance consisting essentially of nickel, wherein the content of said rare earth element is from 55 to 65% by weight.

6. The magnetic refrigerant according to claim 5, wherein said sintered body comprises (a) at least about 35% by weight and not more than about 65% by weight of at least one heavy rare earth elements selected from the group consisting of gadolinium, terbium, dysprosium, holmium, erbium, thulium and ytterbium and (b) up to about 35% by weight of at least one rare earth element from the group consisting of lanthanum, cerium, praseodymium, neodymium, promethium, samarium, europium, and yttrium.

7. The magnetic refrigerant according to claim 5, wherein said sintered body has a density of 8 g/cm$^3$ or more.

8. The magnetic refrigerant according to claim 5 wherein said balance further contains at least one of cobalt and aluminum.

9. A magnetic refrigerant for magnetic refrigeration which comprises a sintered body consisting essentially of at least one rare earth element selected from the group consisting of lanthanum, cerium, praseodymium, neodymium, promethium, samarium, europium, gadolinium, terbium, dysprosium, holmium, erbium, thulium, ytterbium and yttrium and a balance consisting essentially of cobalt, wherein the content of said rare earth element is from 55 to 65% by weight.

10. The magnetic refrigerant according to claim 9, wherein said sintered body comprises (a) at least about 35% by weight and not more than about 65% by weight of at least one heavy rare earth elements selected from the group consisting of gadolinium, terbium, dysprosium, holmium, erbium, thulium and ytterbium and (b) up to about 30% by weight of at least one rare earth element from the group consisting of lanthanum, cerium, praseodymium, neodymium, promethium, samarium, europium, and yttrium.

11. The magnetic refrigerant according to claim 9, wherein said sintered body has a density of 7 g/cm$^3$ or more.

12. The magnetic refrigerant according to claim 9, wherein said balance further contains at least one of aluminum and nickel.

13. The magnetic refrigerant according to claim 9, wherein said group consists of praseodymium, dysprosium, holmium, erbium and thulium.

14. A magnetic refrigerant for magnetic refrigeration which comprises a sintered body consisting essentially of at least one rare earth element selected from the group consisting of lanthanum, cerium, praseodymium, neodymium, promethium, europium, gadolinium, terbium, dysprosium, holmium, erbium, thulium, ytterbium and yttrium and a balance consisting essentially of cobalt, wherein the content of said rare earth element is from 55 to 65% by weight.

* * * * *